United States Patent [19]
McNabb et al.

[11] Patent Number: 6,076,371
[45] Date of Patent: Jun. 20, 2000

[54] FROZEN BEVERAGE STORAGE AND DISPENSING APPARATUS

[75] Inventors: Rex P. McNabb, Dallas, Tex.; Anthony B. Solomon, Bossier City, La.

[73] Assignees: Southwest Instruments Company, Inc., Garland, Tex.; Icee Distributors, Inc., Bossier City, La.

[21] Appl. No.: 09/106,810

[22] Filed: Jun. 29, 1998

[51] Int. Cl.[7] .................................................. A23G 9/12
[52] U.S. Cl. ........................ 62/342; 15/104.14; 366/311
[58] Field of Search ..................... 62/342, 343; 366/309, 366/311, 312, 313; 15/104.14

[56] References Cited

U.S. PATENT DOCUMENTS

| | | | |
|---|---|---|---|
| 2,005,359 | 6/1935 | Bagnoli et al. | 15/104.14 |
| 2,282,298 | 5/1942 | Vogel | 366/312 |
| 2,366,131 | 12/1944 | Spaulding | 15/104.14 |
| 2,836,401 | 5/1958 | Phelan | 366/311 |
| 3,199,574 | 8/1965 | Keller | 366/312 |
| 5,074,125 | 12/1991 | Schifferly | 366/312 |
| 5,644,926 | 7/1997 | Kress | 62/342 |
| 5,709,095 | 1/1998 | Johnson | 366/311 |

*Primary Examiner*—William E. Tapolcai
*Attorney, Agent, or Firm*—W. Kirk McCord

[57] ABSTRACT

Improved apparatus for storing and dispensing material, such as a beverage, in at least a partially frozen state. The apparatus includes a tank in which the material is stored under pressure and a manually operable valve for controlling the dispensing of material from the tank. The valve includes a generally cylindrical stem and seat. A distal end portion of the stem is tapered at an angle of about 15 degrees. When the valve is first opened, the tapered end portion gradually relieves the pressure buildup in the valve bore so that a sudden surge of material under pressure does not occur in the dispensing passageway to which the valve is connected. An upper edge of the seat acts as a scraper to remove particulate matter from the stem as the stem is moved into engagement with the seat when the valve is closed, thereby enhancing the fluid-tight seal between the stem and seat. Another scraping device is located in the tank to remove ice and other particles from an inner wall thereof The tank scraping device includes a rotatable blade which is movable radially with respect to the axis rotation and is held in frictional engagement with the tank wall by centrifugal force when the blade is rotated, to continuously scrape the inner wall of the tank. The blade is preferably mounted for corotation with a device which is used to stir and mix the material in the storage tank.

15 Claims, 5 Drawing Sheets

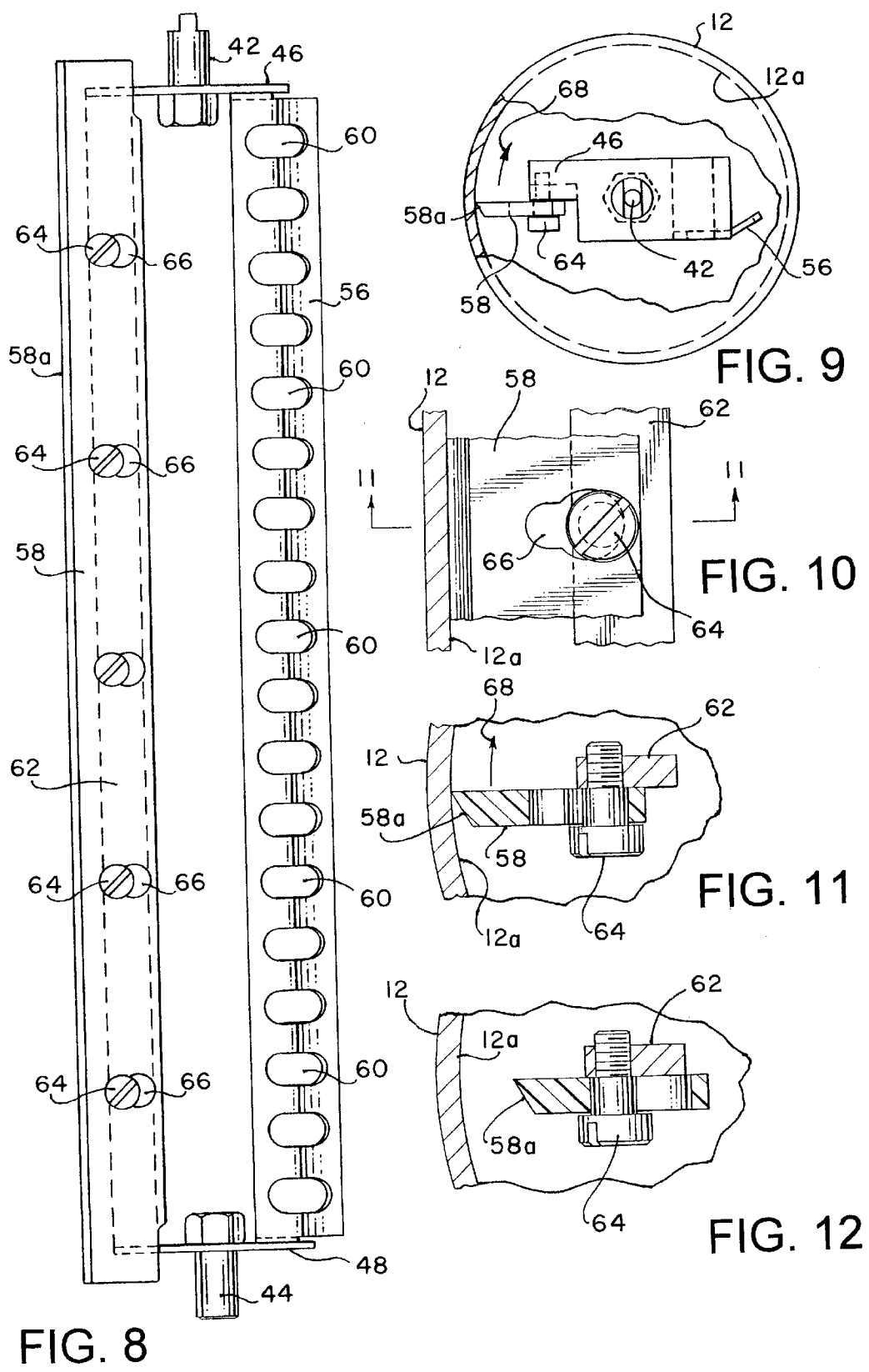

FROZEN BEVERAGE STORAGE AND DISPENSING APPARATUS

TECHNICAL FIELD

This invention relates generally to apparatus for storing and dispensing frozen beverages and in particular to improvements in such storage and dispensing apparatus.

BACKGROUND ART

Both carbonated and non-carbonated beverages may be stored in a frozen or semi-frozen state and dispensed in the form of a slush. Typically, frozen or semi-frozen beverages are stored in a tank, which includes a motor-driven blade for stirring and mixing the beverage stored in the tank. Refrigerant is circulated in heat exchange relationship with the tank to keep the beverage stored therein frozen or at least partially frozen. The beverage is stored under relatively high pressure (e.g., 37 psi) and is dispensed by means of a user-operable valve.

One problem associated with prior art apparatus for storing and dispensing such frozen or semi-frozen beverages is that ice will accumulate on the walls of the container, both inside and out. The apparatus typically includes a defrost mechanism for periodically defrosting the container. A defrost cycle may be initiated automatically based on a predetermined elapsed time since the last defrost cycle or it may be initiated in response to a predetermined condition, such as increased load on the blade motor, which is an indication of excessive ice buildup on the walls of the tank and on the blade drive shaft. During defrost, the dispensing valve is disabled because the beverage may be at least partially melted, which would result in a sudden blast of melted beverage at even greater than normal pressure. Therefore, there is a need to reduce the time required for defrost and to increase the time between defrost cycles.

Another problem associated with such prior art storage and dispensing apparatus is that cf excessive dispensing pressure because of the relatively high pressure under which the beverage is stored. Even when the tank is not being defrosted, opening the valve can release a sudden blast of pressurized beverage, which may result in an unpleasant surprise to the person operating the valve and may also result in loss of control of the cup or other container used by the person operating the valve to capture the beverage. Prior art solutions to this problem have generally involved using a specially designed dispensing passageway or inserting a diffuser into the dispensing passageway to "break up" the flow.

For example, U.S. Pat. No. 4,911,333 describes a specially designed dispensing passageway that directs the beverage radially outwardly toward the walls of the valve bore. Although dispensing pressure is reduced, this type of valve is subject to leakage after the valve is closed because of the beverage residue in the passageway and in the faucet portion of the valve beneath the valve seat. Another solution, as described in U.S. Pat. No. 5,487,493, uses a diffuser member to diffuse the beverage downwardly as well as outwardly as it is being dispensed, which reduces beverage residue in the dispensing faucet after the valve is closed. This approach also reduces dispensing pressure, but there may still be a sudden release of the beverage when the valve is first opened, particularly if the beverage is in a liquid state. Therefore, there is a need to prevent a sudden surge of pressurized beverage when the dispensing valve is opened.

Yet another problem associated with prior art storage and dispensing apparatus is that when a frozen beverage is dispensed, small particles of ice may accumulate around the valve stem and prevent fluid-tight engagement of the valve stem with the valve seat, which may result in valve leakage. Further, when the beverage is a fruit drink, such as a strawberry drink, seeds from the small pieces of fruit present in the drink may also accumulate around the valve stem and further prevent fluid-tight engagement of the valve stem with the valve seat. Therefore, there is a need to remove ice and seed residue from the valve stem and seat so as not to interfere with valve closure.

SUMMARY OF THE INVENTION

In accordance with present the invention, apparatus is provided for storing material in at least a partially frozen state. The apparatus includes a tank in which the material is stored under pressure. A scraping device is mounted for rotation within the tank. The device is movable radially with respect to an axis of rotation of the scraping device. The device is urged radially outwardly from the axis of rotation and is held in frictional engagement with an inner wall of the tank by centrifugal force when the device is rotated, to remove solid material such as ice from the inner wall.

In accordance with a feature of the invention, the scraping device includes a blade positionable in contact with the inner wall. The blade has plural openings spaced longitudinally therealong, each of the openings having a major axis extending radially with respect to the axis of rotation. The scraping device further includes a plate having plural projections extending through respective openings, whereby the blade is mounted with the plate and is able to move radially with respect to the axis of rotation a distance in each direction equal to a length of each opening. In accordance with another feature of the invention a rotatable mixing device is located in the tank for mixing the material. The scraping device is mounted for corotation with the mixing device. The scraping device and the mixing device are coupled together by opposed end plates and are corotated by means of stub shafts projecting from the respective end plates. By not having a center shaft extending between the end plates, ice buildup on the center shaft is not a problem.

In operation, as the mixing device is rotated to mix and stir the material, the speed of rotation forces the blade of the scraping device radially outwardly and holds it in frictional engagement with the inner wall of the storage tank. By continuously scraping the inner wall of the tank and by eliminating the center shaft, ice buildup is inhibited, which has the advantage of reducing the need for defrosting the container. The time between defrost cycles is therefore increased and the duration of each defrost cycle is decreased.

BRIEF DESCRIPTION OF DRAWINGS

FIG. 8 is a frontal elevation view of the stirring/mixing device;

FIG. 9 is a top plan view, showing operation of the stirring/mixing device within the tank;

FIG. 10 is a detailed elevation view, showing a blade portion of the stirring/mixing device in contact with an inner wall of the tank;

FIG. 11 is a sectional view, taken along the line 11—11 in FIG. 10, showing the blade portion in contact with the inner wall; and FIG. 12 is a sectional view, similar to FIG. 11, but showing the blade portion out of engagement with the inner wall.

BEST MODE FOR CARRYING OUT THE INVENTION

In the description which follows, like parts are marked throughout the specification and drawings with the same respective reference numbers. The drawings are not necessarily to scale and in some instances proportions may have been exaggerated in order to more clearly describe the best mode for carrying out the invention.

Figure 1:
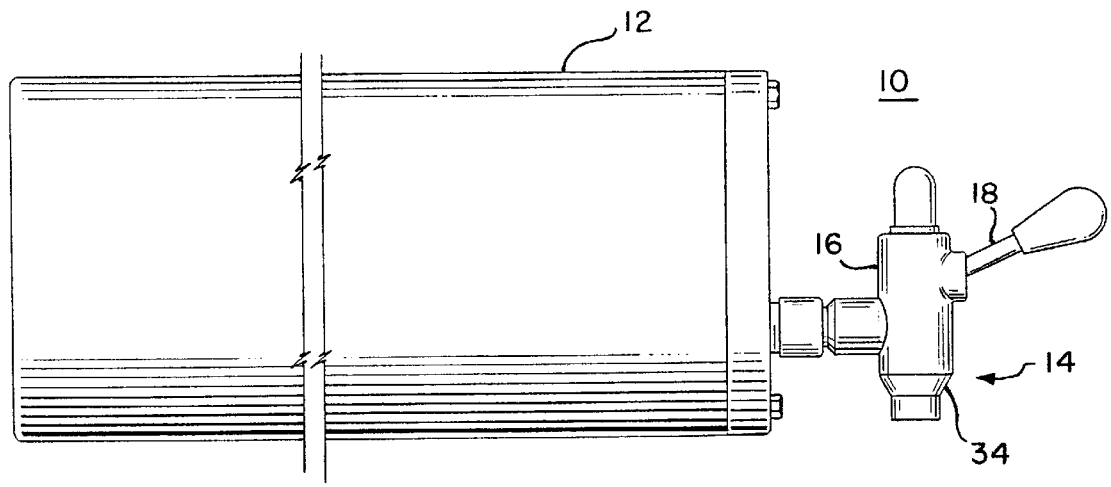
FIG. 1 is a side elevation view of a frozen beverage storage tank and dispensing valve, according to the present invention.

Referring now to FIG. 1, apparatus 10 for dispensing material, such as a beverage, in at least a partially frozen state from a container in which the beverage is stored, such as a tank 12, includes a dispensing valve 14 operable to control the dispensing of the beverage from tank 12. Tank 12 is operably connected to a refrigeration system (not shown) for cooling the interior of tank 12 to maintain the beverage stored therein in a frozen or at least semi-frozen state. Preferably, the beverage stored in tank 12 has the consistency of a slush. The beverage is stored and dispensed under pressure (e.g., 37 psi).

Valve 14 has a main body 16, which includes a horizontal portion 16a and a vertical portion 16b, and a manually operable lever 18 mounted by means of a pivot pin 20 for up and down tilting movement relative to body 16. Valve 14 is mounted with tank 12 by means of a threaded nut 15 carried on horizontal body portion 16a. Nut 15 is coupled to a nipple 17 projecting from tank 12 with the female threads of nut 15 in engagement with the male threads of nipple 17. An O-ring 19 effects a fluid-tight seal between nut 15 and nipple 17.

Figure 2:
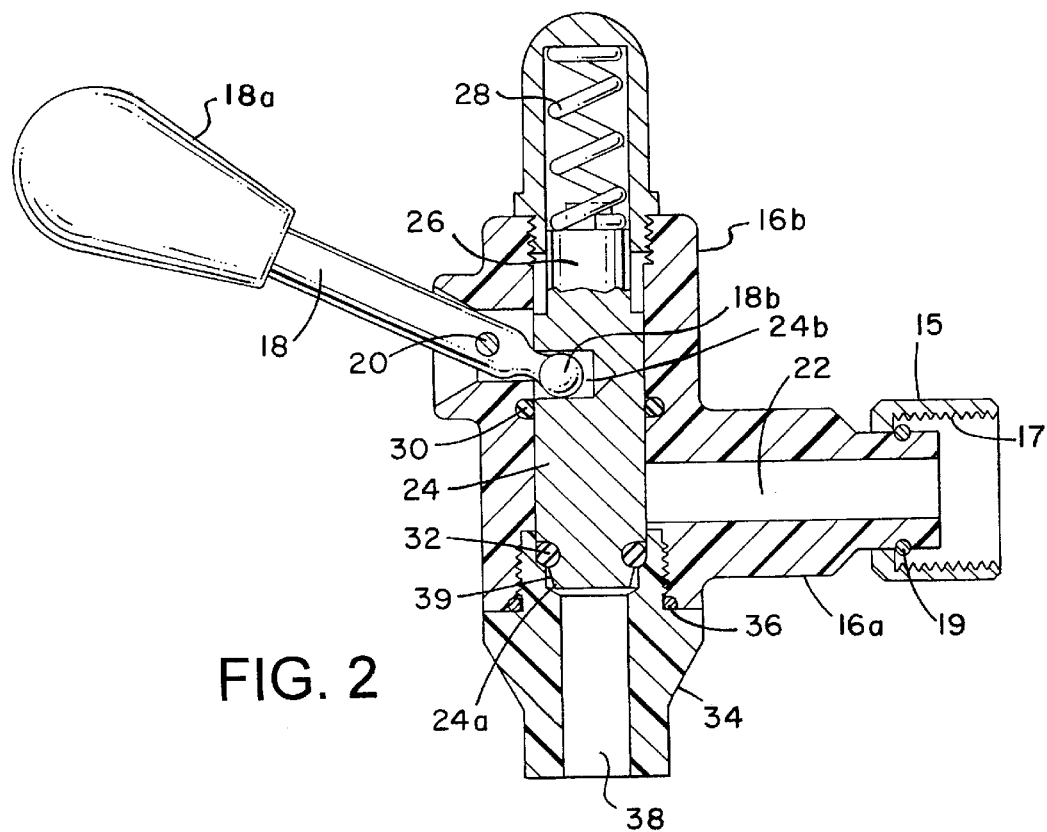
FIG. 2 is a sectional view of the dispensing valve, showing the valve in a fully closed position.

Lever 18 has a handle portion 18a at one end thereof to facilitate manual operation of lever 18. Referring also to FIG. 2, horizontal body portion 16a has an elongated, generally horizontal bore 22, which is in fluid communication with the interior of tank 12 when nut 15 is coupled to nipple, as described hereinabove. Lever 18 is operably connected to a valve stem 24 by means of a ball portion 18b at an opposite end of lever 18 from handle portion 18a. Ball portion 18b is in mating engagement with a cutout 24b in stem 24. Stem 24 is reciprocally moveable within an elongated, generally vertical bore 26 within vertical body portion 16b. A spring 28 in an upper portion of bore 26 biases stem 24 toward the fully closed position of valve 14 shown in FIG. 2.

Figure 5:
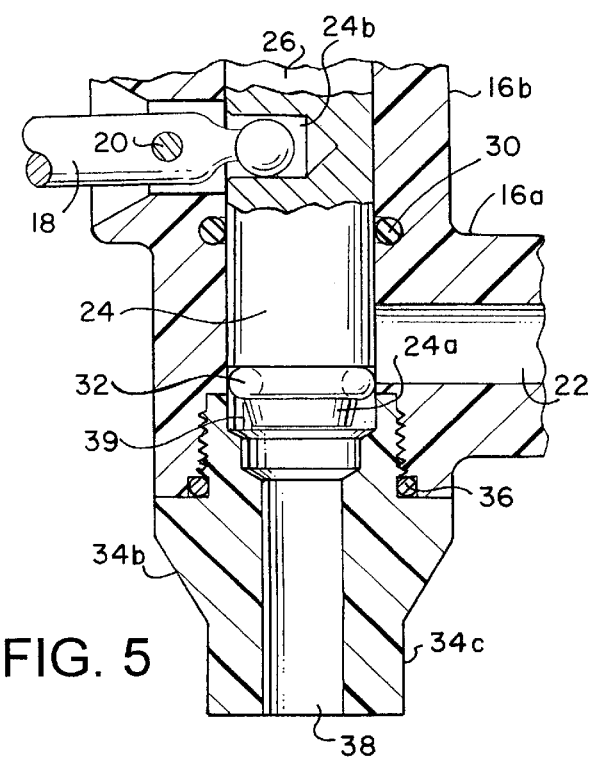
FIG. 5 is a sectional view of the dispensing valve, showing the valve in an intermediate position between fully closed and fully open.
Figure 6:
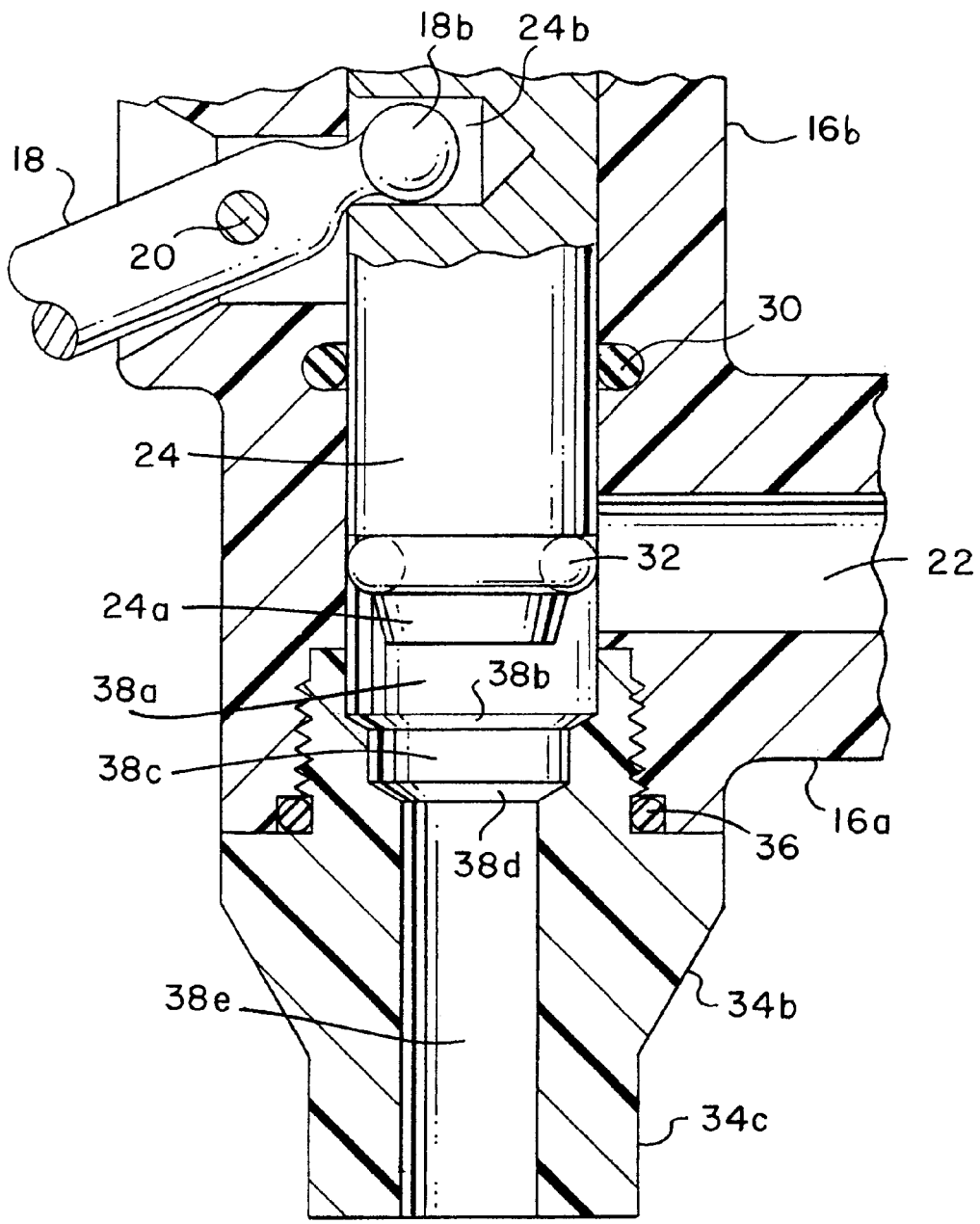
FIG. 6 is a sectional view of the valve, showing it in a fully open position.
Figure 7:
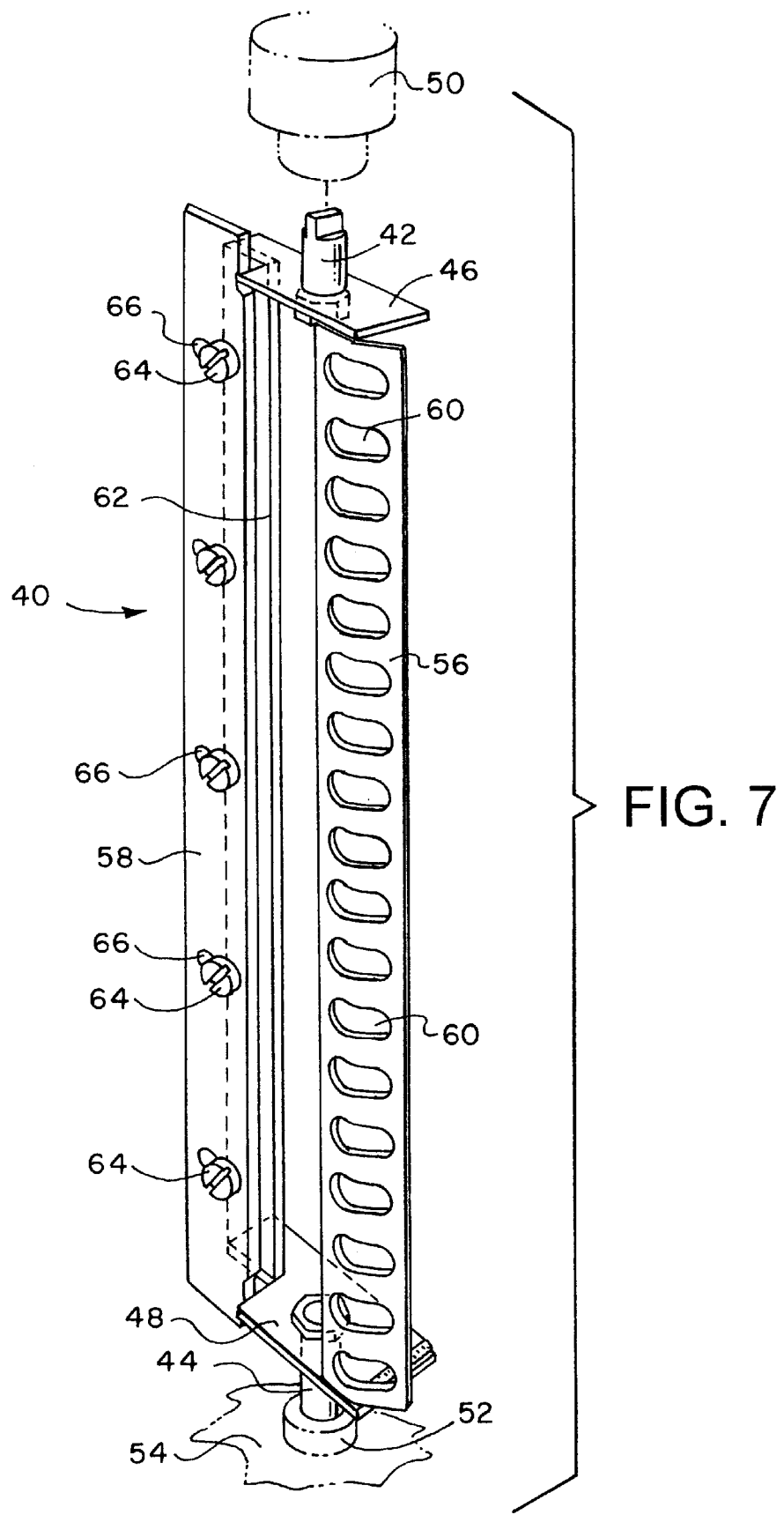
FIG. 7 is a perspective view of a stirring/mixing device used in the storage tank.

When valve 14 is in the fully closed position, lever 18 is tilted upwardly as shown in FIG. 2. Valve 14 is opened by grasping handle portion 18a and exerting sufficient downward pressure thereon to overcome the bias of spring 28 and tilt lever 18 downwardly. The downward tilting movement of lever 18 moves stem 24 upwardly within bore 26, as can be best seen by viewing FIGS. 5 and 6 along with FIG. 2. In FIG. 5, stem 24 is in a position corresponding to an intermediate position of valve 14 between fully closed and filly open. Note that lever 18 is in an approximately horizontal position in FIG. 5. In FIG. 6, stem 24 is in a position corresponding to the fully open position of valve 14. Note that lever 18 is in a downwardly tilted position in FIG. 6.

As can be best seen in FIGS. 2, 5 and 6, an O-ring 30 is located in a circumferential notch in vertical body portion 16b surrounding bore 26. O-ring 30 engages a cylindrical outer surface of stem 24 to prevent the beverage, which is under pressure in tank 12, from flowing upwardly through bore 26. As can be best seen in FIG. 3, stem 24 is generally cylindrical with an inwardly tapered conical end portion 24a. End portion 24a is tapered inwardly to a distal end of stem 24 at an angle relative to a longitudinal axis of stem 24 of about 5 to 25 degrees, with about 15 degrees having been determined by empirical testing to be the preferred angle. Stem 24 also has a circumferential notch proximate to end portion 24a in which another O-ring 32 is located.

Figure 3:
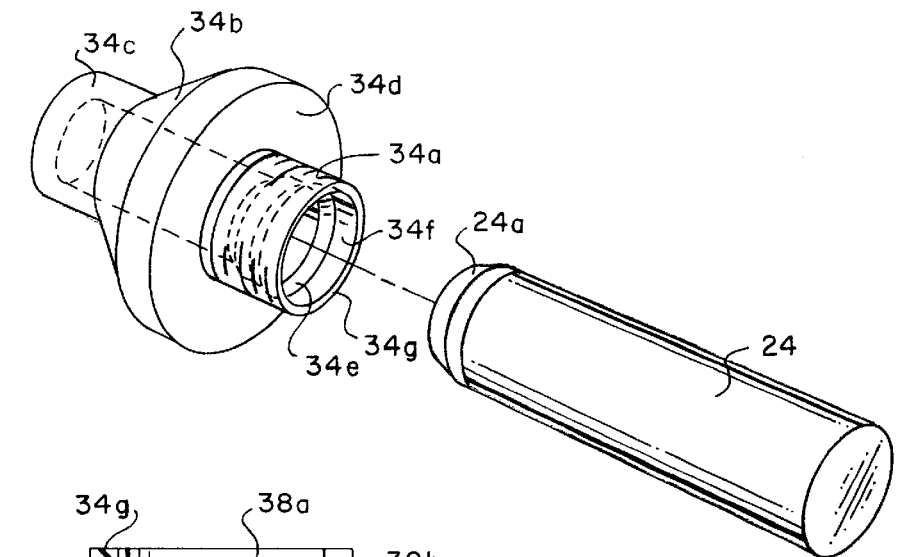
FIG. 3 is an exploded perspective view of the seat and stem of the dispensing valve.
Figure 4:
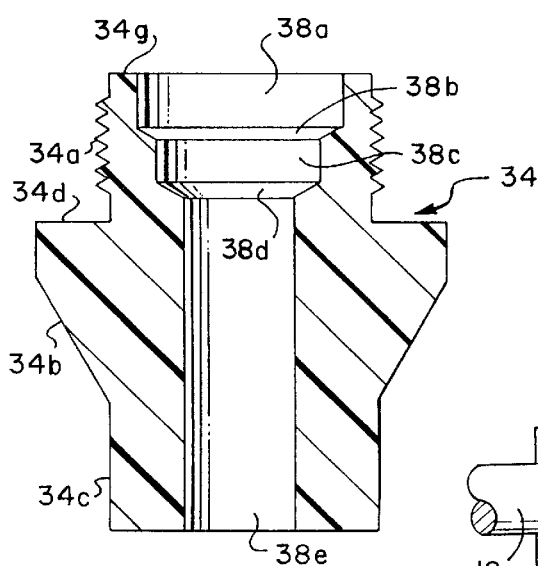
FIG. 4 is a sectional view of the valve seat.

Referring in particular to FIGS. 3 and 4, valve 14 further includes a seat member 34, the exterior surface of which defines a cylindrical upper portion 34a, a conical intermediate portion 34b and a cylindrical lower portion 34c. An outer surface of upper portion 34a has male threads for engagement with complementary female threads in vertical body portion 16b. When seat member is in threaded engagement with vertical body portion 16b, a shoulder 34d of seat member 34 is in contact with a bottom surface of vertical body portion 16b. An O-ring 36 is located on shoulder 34d to provide fluid-tight contact between seat member 34 and vertical body portion 16b. The interior of seat member 34 is defined by a central passageway 38, comprising an upper cylindrical portion 38a, an upper conical portion 38b, an intermediate cylindrical portion 38c, a lower conical portion 38d and an elongated lower cylindrical portion 38e. Both conical portions 38b, 38d are tapered inwardly at an angle of about 30 degrees relative to a longitudinal axis of passageway 38, such that the diameter of cylindrical portion 38a is greater than the diameter of cylindrical portion 38c and the diameter of cylindrical portion 38c is greater than the diameter of cylindrical portion 38e.

In operation, when valve 14 is in the fully closed position, as shown in FIG. 2, O-ring 32 is seated against a conical inner wall 34e of seat member 34, which defines upper conical portion 38b of passageway 38. In accordance with a feature of the invention, as stem 24 is moved downwardly to the fully closed position of valve 14, and an upper edge 34g of seat member 34 scrapes ice, seeds and other particulate matter from stem 24 and O-ring 32 so that such particulate matter does not interfere with a fluid-tight seal between O-ring 32 and inner wall 34e when valve 14 is in the fully closed position. Further, a cylindrical inner wall 34f of seat member 34, which defines upper cylindrical portion 38a of passageway 38, frictionally engages stem 24 and O-ring 32 to inhibit the particulate matter scraped from stem 24 and O-ring 32 from falling downwardly into seat member 34. Inner wall 34f is proximate to upper edge 34g.

In accordance with another feature of the invention, conical end portion 24a of stem 24 is operable to relieve pressure gradually within bore 22 and bore 26, so that a sudden surge of beverage does not occur within passageway 38 when valve 14 is opened. As can be best in FIGS. 2 and 5, an annular clearance 39 exists between end portion 24a and the inner wall of seat member 34 which defines passageway 38. When valve 14 is opened, O-ring 32 is disengaged from seat member 34, as can be best seen in FIG. 5, which allows the material to flow under pressure through bore 22 and then into bore 26, where it flows between stem 24 and the inner wall of vertical body portion 16b. Instead of the material flowing unabated into passageway 38 when O-ring 32 is disengaged from seat member 34, the material first flows into annular clearance 39, which has the result of gradually relieving the pressure in bore 22 and bore 26 before the material enters passageway 38, so that a sudden surge of material under pressure does not occur in passageway 38 when valve 14 is opened. As can be best seen in FIG. 6, when valve 14 is in the fully open position, end portion 24a is fully retracted from seat member 34 so that the material can flow unabated through bore 22 and bore 26 into passageway 38. However, at that point the pressure of the material has been reduced sufficiently to prevent a sudden surge of material in passageway 38. Conical end portion 24a therefore eliminates the need for a diffuser or other special component to reduce the pressure under which the beverage is dispensed. The beverage is dispensed through lower cylindrical portion 38e.

Referring now to FIGS. 7–12, the interior of tank 12 includes a device 40 mounted for rotating movement by means of first and second stub shafts 42, 44 on respective opposed end plates 46, 48 of device 40. Stub shafts 42, 44 project in opposite directions from respective end plates 46, 48. Stub shaft 42 mates with a complementary female member on a motor drive shaft 50, while stub shaft 44 mates with a bearing 52 on a face plate 54 of tank 12. In accordance with a feature of the invention, there is no center shaft connecting end plates 46, 48, thereby eliminating a major surface on which ice tends to accumulate in prior art frozen beverage storage apparatus. Device 40 further includes a stirring/mixing blade 56 and a scraper blade 58. Blade 56 has plural openings 60 through which the beverage can pass as device 40 is rotated within tank 12. The solid surfaces of blade 56 stir and mix the beverage to maintain a slush-like consistency.

As can be best seen in FIG. 8, blade 58 is mounted on a back plate 62 by means of plural mounting screws 64, which project from back plate 62. Blade 58 has plural elongated openings 66 spaced longitudinally along blade 58. Each screw 64 extends through an elongated opening 66. Openings 66 have sufficient length in a radial direction to allow screws 64 to slide back and forth within the respective openings 66 so that blade 58 is able to move radially with respect to an axis of rotation of device 40 passing through stub shafts 42, 44. The length of each opening 66 in a radial direction determines the amount of radial movement of blade 58. End plates 46, 48 connect back plate 62 and mixing blade 56, such that mixing blade 56 and scraper blade 58 are mounted for corotation by means of end plates 46, 48.

Blade 58 has a beveled distal edge 58a, as can be best seen in FIGS. 9, 11 and 12. As device 40 is rotated by drive shaft 50, as indicated by arrow 68 in FIG. 9, centrifugal force causes blade 58 to move radially outwardly so that beveled edge 58a contacts inner wall 12a of tank 12, as can be best seen in FIGS. 9–11. Further, as device 40 is rotated, centrifugal force holds beveled edge 58a in frictional engagement with inner wall 12a so that edge 58a continuously scrapes ice and other residue from inner wall 12a. As the rotation of device 40 slows down and begins to stop, blade 58 tends to move radially inwardly back toward the axis of rotation of device 40 because the centrifugal force is no longer sufficient to hold edge 58a in frictional engagement with inner wall 12a, as shown in FIG. 12. Instead, as the rotational speed diminishes, inner wall 12a tends to repel blade 58 away so that it moves radially inwardly back toward the axis of rotation. By continuously scraping inner wall 12a and by eliminating the center shaft, as described above, ice accumulation is substantially inhibited so that there is less need for defrosting. Therefore, the defrost cycles will be shorter and the time between defrost cycles will be greater.

The best mode for carrying out the invention has now been described in detail. Since changes in and additions to the above-described best mode may be made without departing from the nature, spirit and scope of the invention, the invention is not to be limited to said details, but only by the appended claims and their equivalents.

We claim:

1. In apparatus for storing material in at least a partially frozen state, said apparatus including a tank in which the material is stored under pressure and a blade mounted for rotation within said tank, said blade being movable radially with respect to an axis of rotation thereof and being urged radially outwardly from said axis of rotation for frictional engagement with an inner wall of said tank by centrifugal force when said blade is rotated to remove solid material from said inner wall, wherein the improvement comprises plural openings spaced longitudinally along said blade, each of said openings having a major axis extending radially with respect to said axis of rotation, said apparatus further including a plate having plural projections extending through respective openings in said blade, whereby said blade is mounted with said plate and is able to move radially with respect to said axis of rotation a distance in each direction equal to a length of one of said openings.

2. Apparatus of claim 1 further including means for cooling an interior of said tank to maintain the material in at least a partially frozen state.

3. Apparatus of claim 1 wherein said blade has a beveled edge positionable in contact with said inner wall.

4. Apparatus of claim 1 further including means for rotating said blade about said axis of rotation.

5. Apparatus of claim 1 further including a rotatable mixing device located in said tank for mixing the material, said blade being mounted for corotation with said mixing device.

6. Apparatus of claim 1 wherein said blade is mounted for radial movement with respect to said mixing device.

7. Apparatus of claim 1 wherein said projections include plural screws projecting from said plate and extending through said respective openings.

8. Apparatus of claim 1 further including a valve mountable with said tank for controlling the dispensing of the material under pressure, said valve having a main body with an internal bore for communicating with an interior of said tank, a passageway for dispensing the material, a seat intermediate said bore and said passageway, and a stem movable within said bore into and out of engagement with said seat to respectively close and open said valve, said seat having means for scraping an outer surface of said stem as said stem is moved into and out of engagement with said seat, whereby particulate matter which could interfere with the closure of said valve is removable.

9. Apparatus of claim 1 further including a valve mountable with said tank for controlling the dispensing of the material under pressure, said valve having a main body with an internal bore for communicating with an interior of said tank, a passageway for dispensing the material, a seat intermediate said bore and said passageway, and a stem movable within said bore into and out of engagement with said seat to respectively close and open said valve, said passageway being in fluid communication with said bore when said valve is open to allow material to flow under pressure from said tank through said bore into said passageway, said stem having a tapered end portion operable to allow material to enter said passageway gradually as said stem is disengaged from said seat, whereby a surge of material into said passageway is prevented when said valve is opened.

10. In apparatus for storing material in at least a partially frozen state, said apparatus including a tank in which the material is stored under pressure, a rotatable mixing device located in said tank for mixing the material and a rotatable scraping device positioned to engage an inner wall of said tank to remove solid material therefrom when said scraping device is rotated, wherein the improvement comprises first and second end plates coupling said scraping device and said mixing device at respective opposed ends thereof and first and second stub shafts projecting from said first and second end plates, respectively, at least one of said stub shafts being engageable with a drive mechanism, whereby said scraping device and said mixing device are corotatable without a center shaft extending between said first and second end plates.

11. Apparatus of claim 10 wherein said mixing device includes a mixing blade having plural openings through which the material is allowed to pass when said mixing device is rotated.

12. Apparatus of claim 11 wherein said scraping device includes a scraping blade having a beveled edge positionable in contact with said inner wall.

13. Apparatus of claim 10 wherein said scraping device is movable radially with respect to an axis of rotation of said scraping device and said mixing device when said scraping device and said mixing device are corotated.

14. Apparatus of claim 10 further including a drive mechanism engageable with at least one of said stub shafts for corotating said scraping device and said mixing device.

15. Apparatus for storing material in at least a partially frozen state, said apparatus comprising:

a container in which the material is stored under pressure;

a scraper blade located in said container and having plural openings spaced longitudinally therealong;

a backing plate located in said container and having plural projections extending through respective openings in said blade to mount said scraper blade with said backing plate;

a mixing blade located in said container for mixing the material; and first and second end plates coupling said scraper blade and said mixing blade at respective opposed ends thereof and first and second stub shafts projecting from said first and second end plates, respectively, at least one of said stub shafts being engageable with a drive mechanism, whereby said scraper blade and said mixing blade are corotatable about an axis of rotation without a shaft extending along said axis of rotation between said first and second end plates, said scraper blade being movable radially with respect to said axis of rotation and said backing plate a distance equal to a length of one of said openings in a radial direction with respect to said axis of rotation, said scraper blade being urged radially outwardly from said axis rotation for frictional engagement with an inner wall of said container by centrifugal force when said scraper blade and said mixing blade are corotated, whereby solid material is removed from said inner wall by said scraper blade.

\* \* \* \* \*